US012662270B1

(12) United States Patent
Wang et al.

(10) Patent No.: US 12,662,270 B1
(45) Date of Patent: Jun. 23, 2026

(54) UNMANNED AERIAL VEHICLE TAKEOFF AND LANDING SYSTEM

(71) Applicant: METAL INDUSTRIES RESEARCH AND DEVELOPMENT CENTRE, Kaohsiung (TW)

(72) Inventors: Wei-Ching Wang, Kaohsiung (TW); Shun-Yuan Cheng, Kaohsiung (TW); Yu-An Chen, Kaohsiung (TW); Jia-Cheng Li, Kaohsiung (TW); Shuo-Yen Chen, Kaohsiung (TW); Wei-Te Chen, Kaohsiung (TW)

(73) Assignee: METAL INDUSTRIES RESEARCH AND DEVELOPMENT CENTRE, Kaohsiung (TW)

( * ) Notice: Subject to any disclaimer, the term of this patent is extended or adjusted under 35 U.S.C. 154(b) by 0 days.

(21) Appl. No.: 19/350,229

(22) Filed: Oct. 6, 2025

(51) Int. Cl.
B64U 70/97 (2023.01)
B64U 50/37 (2023.01)
G06K 7/14 (2006.01)

(52) U.S. Cl.
CPC ............. B64U 70/97 (2023.01); B64U 50/37 (2023.01); G06K 7/1413 (2013.01)

(58) Field of Classification Search
CPC ....... B64U 50/37; B64U 70/97; G06K 7/1413
See application file for complete search history.

(56) References Cited

U.S. PATENT DOCUMENTS

| 7,040,247 | B2 * | 5/2006 | Chouery ................. B63B 35/50 |
| | | | 244/116 |
| 12,583,623 | B1 * | 3/2026 | Dayan ....................... B64F 1/35 |
| 2021/0163135 | A1 * | 6/2021 | Shin ...................... H01F 27/366 |
| 2025/0026509 | A1 * | 1/2025 | Infanti ................... B64U 70/50 |
| 2025/0108943 | A1 * | 4/2025 | Sekiguchi .............. B64U 70/95 |

* cited by examiner

*Primary Examiner* — Tye William Abell
(74) *Attorney, Agent, or Firm* — MUNCY, GEISSLER, OLDS & LOWE, P.C.

(57) ABSTRACT

An unmanned aerial vehicle (UAV) takeoff and landing system is adapted to be used with a UAV, and includes a landing member and a parking platform. The landing member is adapted to be disposed under the UAV. The parking platform is adapted for guiding the UAV to land thereon, and includes a top wall, a guiding wall, and a bottom wall. The top wall surrounds a longitudinal axis and defines a through hole extending therethrough along the longitudinal axis. The guiding wall extends downwardly from a hole-defining periphery of the top wall along the longitudinal axis, and converges downwardly along the longitudinal axis. The bottom wall is connected to one end of the guiding wall opposite to the through hole, and cooperates with the guiding wall to define a parking space for accommodating the landing member.

16 Claims, 6 Drawing Sheets

UNMANNED AERIAL VEHICLE TAKEOFF AND LANDING SYSTEM

FIELD

The disclosure relates to an aviation auxiliary system, and more particularly to an unmanned aerial vehicle takeoff and landing system.

BACKGROUND

Unmanned aerial vehicles (UAVs), also known as drones, are widely used in the fields of scientific research, site exploration, military, and recreational entertainment due to their free mobility and vertical takeoff and landing ability. In recent years, the importance of offshore wind power has been gradually increasing with government green energy policies. However, the high risk of offshore wind power operations, e.g., inspecting and repairing wind turbine blades of offshore wind power equipment, has led to a persistent labor shortage. Therefore, manufacturers have introduced UAVs into the offshore wind power industry for offshore wind power operations, thereby mitigating the problem of labor shortage in the offshore wind power industry.

For example, after completing offshore wind power operations, a UAV is guided by the Global Positioning System (GPS) to land on a platform set up at sea near the offshore wind power equipment, and then undergoes charging, components maintenance, and other maintenance work. However, the accuracy of GPS is usually affected by factors such as weather and satellite geometry, and the UAV may not be able to accurately land on the platform. Furthermore, since the platform set up at sea may experience rocking and tilting as a result of wind waves, severe damage may be caused to both the UAV and the platform.

SUMMARY

Therefore, an object of the present disclosure is to provide an unmanned aerial vehicle (UAV) takeoff and landing system that can alleviate at least one of the drawbacks of the prior art.

According to an aspect of the disclosure, an unmanned aerial vehicle (UAV) takeoff and landing system adapted to be used with a UAV is provided. The UAV system includes a landing member and a parking platform. The landing member is adapted to be disposed under the UAV. The parking platform is adapted for guiding the UAV to land thereon, and includes a top wall, a guiding wall, and a bottom wall. The top wall surrounds a longitudinal axis and defines a through hole extending therethrough along the longitudinal axis. The guiding wall extends downwardly along the longitudinal axis from a hole-defining periphery of the top wall defining the through hole, and converges downwardly along the longitudinal axis. The bottom wall is connected to one end of the guiding wall that is opposite to the through hole, and cooperates with the guiding wall to define a parking space for accommodating the landing member.

According to another aspect of the disclosure, a UAV takeoff and landing system includes a UAV, a landing member, and a parking platform. The landing member is disposed under the UAV. The parking platform is for guiding the UAV to land thereon, and includes a top wall, a guiding wall, and a bottom wall. The top wall surrounds a longitudinal axis and defines a through hole extending therethrough along the longitudinal axis. The guiding wall extends downwardly along the longitudinal axis from a hole-defining periphery of the top wall defining the through hole, and converges downwardly along the longitudinal axis. The bottom wall is connected to one end of the guiding wall that is opposite to the through hole, and cooperates with the guiding wall to define a parking space for accommodating the landing member.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
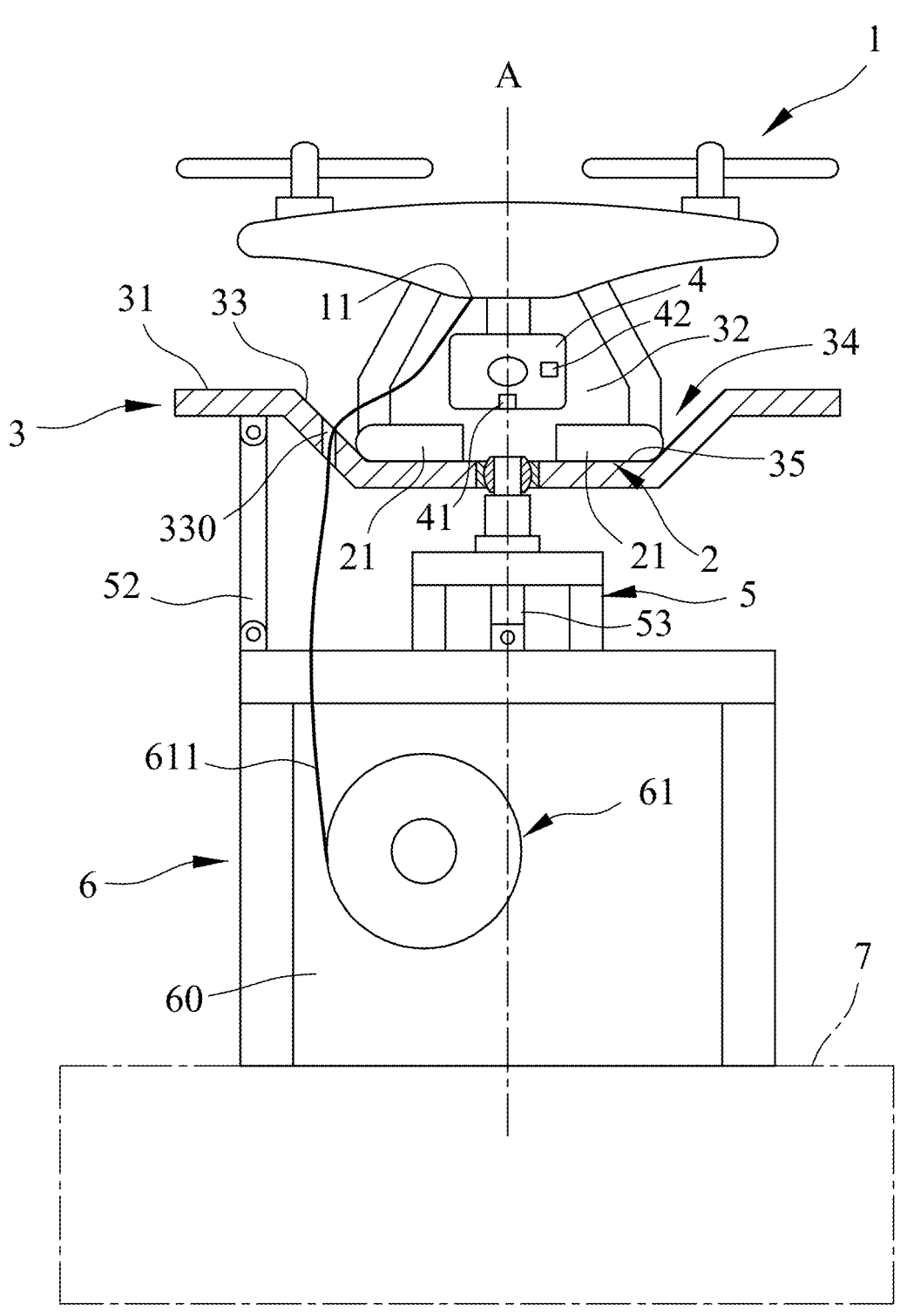
FIG. 1 is a schematic view illustrating a UAV takeoff and landing system of an embodiment according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
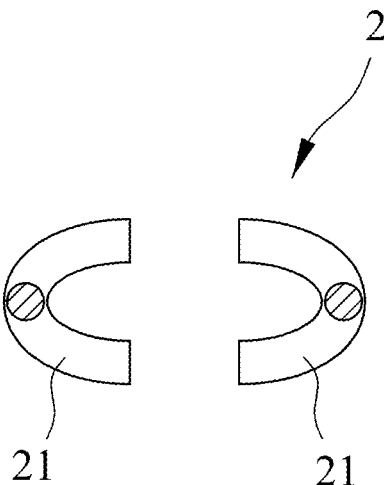
FIG. 2 is a schematic top view illustrating two branch portions of a landing member of the UAV takeoff and landing system of the embodiment.

Referring to FIGS. 1 and 2, an unmanned aerial vehicle (UAV) takeoff and landing system of an embodiment according to the present disclosure is shown. The UAV takeoff and landing system includes a UAV 1, a landing member 2 disposed under the UAV 1, a parking platform 3 for guiding the UAV 1 to be landed thereon, an identification device 4 mounted under the UAV 1, a balance mechanism mounted under the parking platform 3, and a base seat 6 mounted under the balance mechanism 5. In this embodiment, the UAV 1 is used for inspecting and repairing operations of an offshore wind power equipment (not shown), and the base seat 6 is mounted on, e.g., a marine vehicle 7. Thus, the UAV 1 may encounter sea winds during landing, and the parking platform 3 may move with the marine vehicle 7 due to the wind waves.

The landing member 2 is disposed under the UAV 1, and includes two branch portions 21 (see FIG. 2) spaced apart from each other in a transverse direction.

Figure 3:
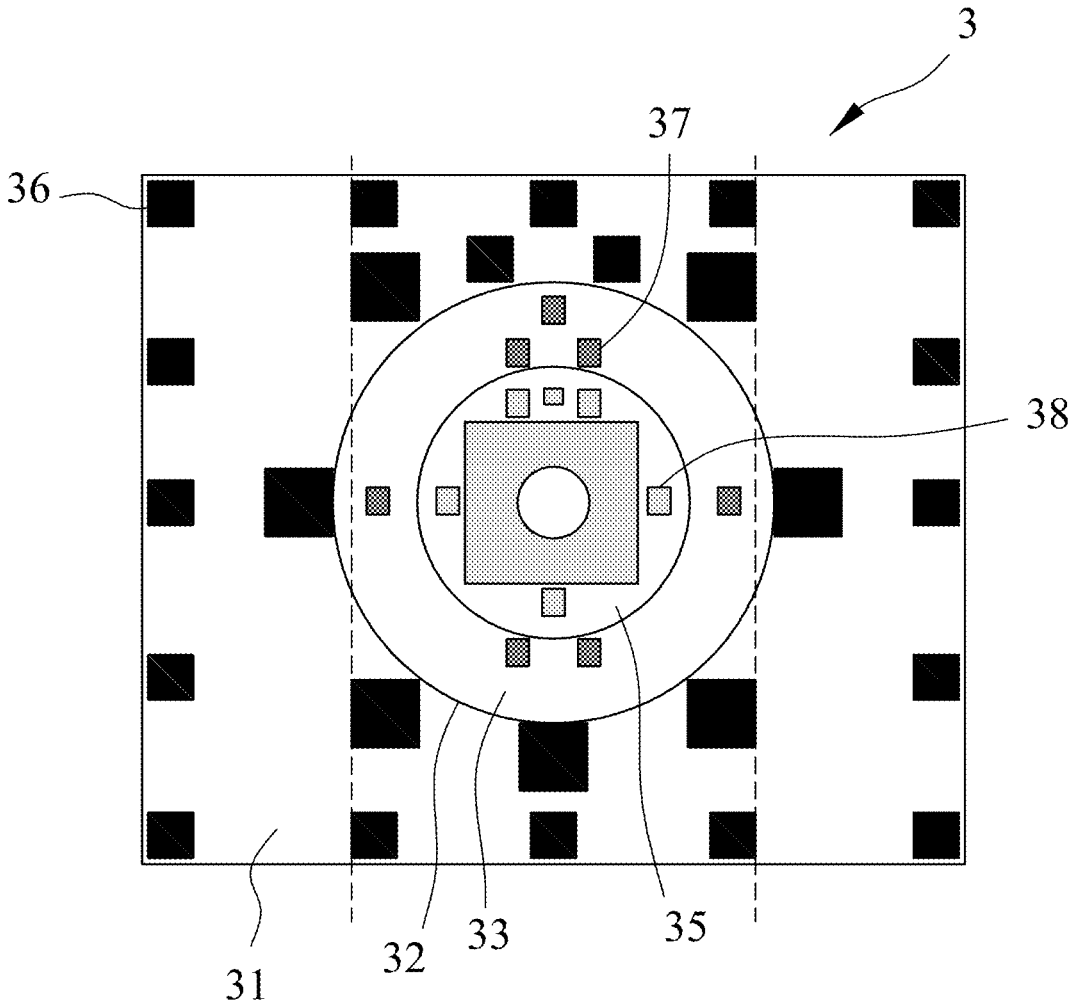
FIG. 3 is a schematic top view, illustrating a first barcode, a second barcode, and a third barcode of a parking platform of the UAV takeoff and landing system of the embodiment.
Figure 4:
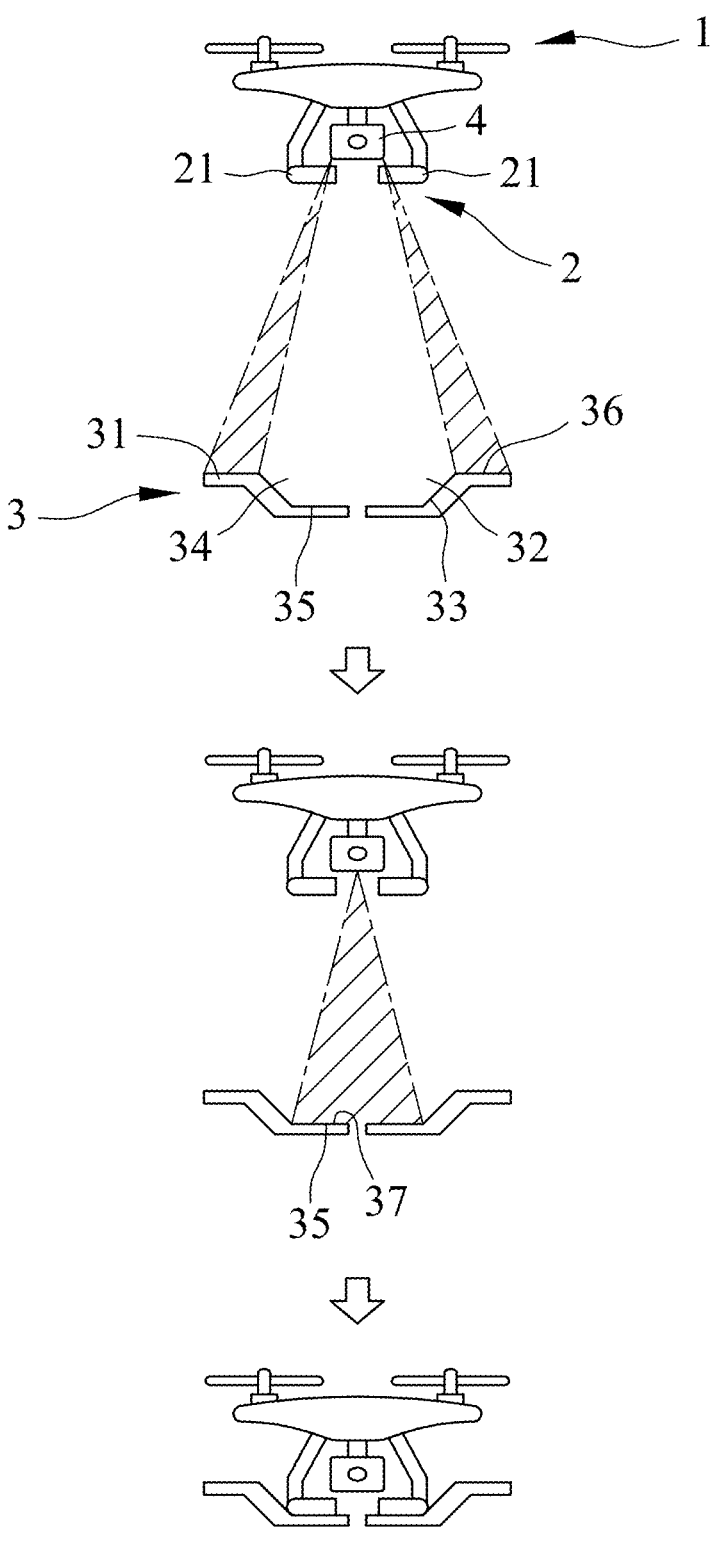
FIG. 4 is a schematic view, illustrating a landing process of the UVA of the UAV takeoff and landing system of the embodiment.

Further referring to FIGS. 3 and 4, the parking platform 3 is used for guiding the UAV 1 to land thereon. The parking platform 3 includes a top wall 31, a guiding wall 33 and a bottom wall 35. The top wall 31 surrounds a longitudinal axis (A) transverse to the transverse direction and defines a through hole 32 extending therethrough along the longitudinal axis (A). The guiding wall 33 extends downwardly along the longitudinal axis (A) from a hole-defining periphery of the top wall 31 defining the through hole 32, and converges downwardly along the longitudinal axis (A). The bottom wall 35 is connected to one end of the guiding wall 33 that is opposite to the through hole 32 and cooperates with the guiding wall 33 to define a parking space 34 for accommodating the landing member 2. As shown in FIG. 3, the parking platform 3 further includes a first barcode 36 disposed on the top wall 31, a second barcode 37 disposed on the guiding wall 33, and a third barcode 38 disposed on the bottom wall 35.

Specifically, each of the branch portions 21 of the landing member 2 has an outermost point that is farthest from the outermost point of another one of the branch portions 21, and a distance between the outermost points of the branch portions 21 in the transverse direction is smaller than a maximum cross-sectional size of the through hole 32 along the longitudinal axis (A), such that the landing member 2 may be moved into the through hole 32, slide downwardly along the guiding wall 33, and land on the bottom wall 35 in a relatively simple manner. In this embodiment, each of the branch portions 21 is semicircular, the branch portions 21 cooperate with each other such that the landing member 2 is circular. Furthermore, the guiding wall 33 is a frusto-conical wall converging downwardly. It should be noted that an acute included angle defined between the guiding wall 33 and the bottom wall 35 is 45 degrees. Furthermore, a junction between an inner surface of the guiding wall 33 and the bottom wall 35 is configured to be complementary in shape with a bottom portion of the landing member 2. In this way, when the UAV 1 is parked on the parking platform 3, the landing member 2 is guided gradually and downwardly by the guiding wall 33 and is thus accommodated in the parking space 34 and confined between the guiding wall 33 and the bottom wall 35. It should be noted that configurations of the branch portions 21 of the landing member 2 may be modified to be square, T-shaped, etc., and the through hole 32 and the guiding wall 33 may also be modified accordingly to guide downward movement of the landing member 2.

The identification device 4 is mounted to the UAV 1, and is configured to sequentially identify the first barcode 36, the second barcode 37 and the third barcode 38, and generate landing information for guiding the UAV 1 to land on the parking platform 3 according to each of the first barcode 36, the second barcode 37 and the third barcode 38. Specifically, referring back to FIG. 1, the identification device 4 includes a camera 41 that captures an image of the parking platform 3, and a processor 42 that is communicatively connected to the UAV 1 and the camera 41. The first barcode 36, the second barcode 37, and the third barcode 38 are two-dimensional barcodes that respectively provide first direction information, second direction information and third direction information. For example, the first direction information is indicative of a bow direction of the marine vehicle 7 and a position of the parking platform 3 mounted on the marine vehicle 7, the second direction information is indicative of the bow direction and a position of the through hole 32 formed in the top wall 31, and the third direction information is indicative of the bow direction and a position of the bottom wall 35. It should be noted that, in this embodiment, an area covered by the first barcode 36 is larger than both of an area covered by the second barcode 37 and an area covered by the third barcode 38. As depicted in FIG. 4, when the UAV 1 is located at a relatively high height (see the top part of FIG. 4), the processor 42 of the identification device 4 may first identify the first barcode 36 that covers the largest area among the first barcode 36, the second barcode 37 and the third barcode 38. Since the parking platform 3 may move with the marine vehicle 7 that is rocked by the wind waves, an image captured by the identification device 4 may be distorted due to the wind waves, which adversely affects the identification device 4 in identifying the first barcode 36. In such case, the identification device 4 determines that the sea state is poor and the UAV 1 does not proceed to land on the parking platform 3. In a case where the wind waves are relatively stable in the sea, a distortion of the image captured by the identification device 4 may be reduced such that the identification device 4 identifies the first barcode 36 to obtain the first direction information, and generates, according to the first barcode 36, the landing information for guiding the UAV 1 to move toward the marine vehicle 7, and to gradually lower down and land on the parking platform 3. After a height of the UAV 1 is lowered to a first predetermined height (see the middle part of FIG. 4) and then to a second predetermined height (see the bottom part of FIG. 4), the identification device 4 may sequentially identify the second barcode 37 and the third barcode 38 to obtain the second direction information and the third direction information, and generate two different landing information respectively according to the second barcode 37 and the third barcode 38. It should be noted that while the UAV 1 is guided to be lowered down, the first direction information, the second direction information and the third direction information are also taken into account for controlling the UAV 1 to rotate about a yaw axis, a roll axis and a pitch axis of the UAV 1, i.e., to yaw, roll and pitch, such that the yaw axis of the UAV 1 is aligned with the longitudinal axis (A). After the UAV 1 is moved into the through hole 32, by virtue of the configuration of the guiding wall 33 that converges downwardly, the landing member 2 is guided by the guiding wall 33 to move downwardly onto the bottom wall 35 to be stably positioned in the parking space 34. It should be noted that the processor 42 of the identification device 4 is a microcontroller or a controller such as, but not limited to, a single core processor, a multi-core processor, a dual-core mobile processor, a micro-processor, a digital signal processor (DSP), a field-programmable gate array (FPGA), an application specific integrated circuit (ASIC), a radio-frequency integrated circuit (RFIC), etc. Furthermore, since the main feature of the present disclosure does not reside in how the UAV 1 is controlled according to the landing information, the first direction information, the second direction information and the third direction information, further details of the same are omitted for the sake of brevity.

Figure 5:
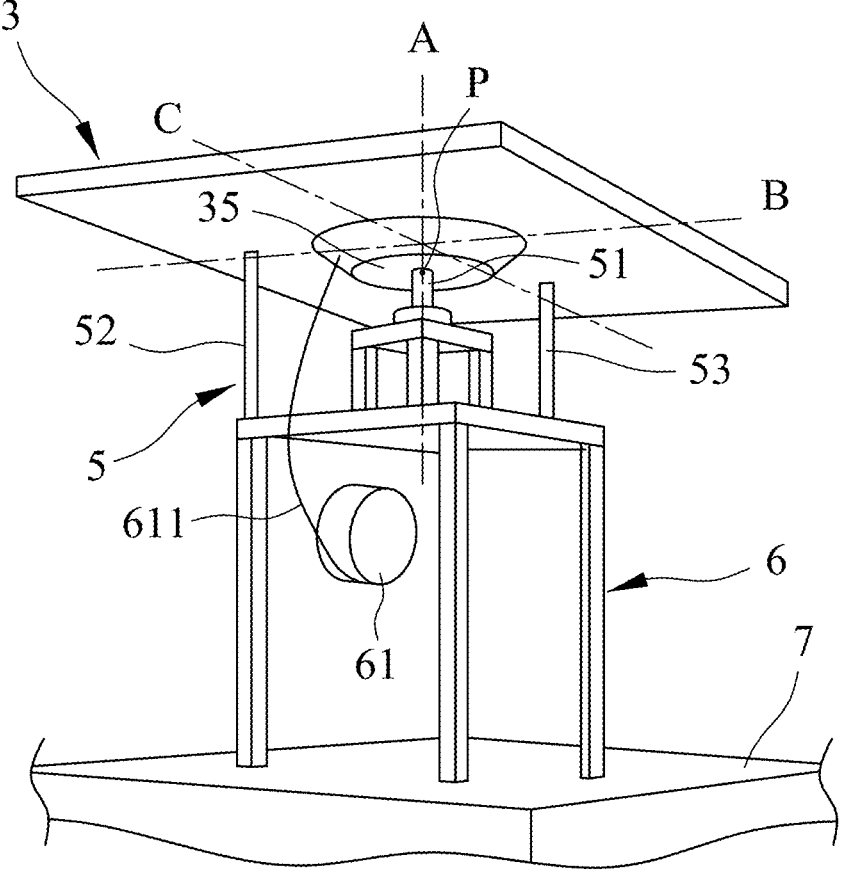
FIG. 5 is a schematic perspective view of a balance mechanism of the UAV takeoff and landing system of the embodiment mounted on a marine vehicle.
Figure 6:
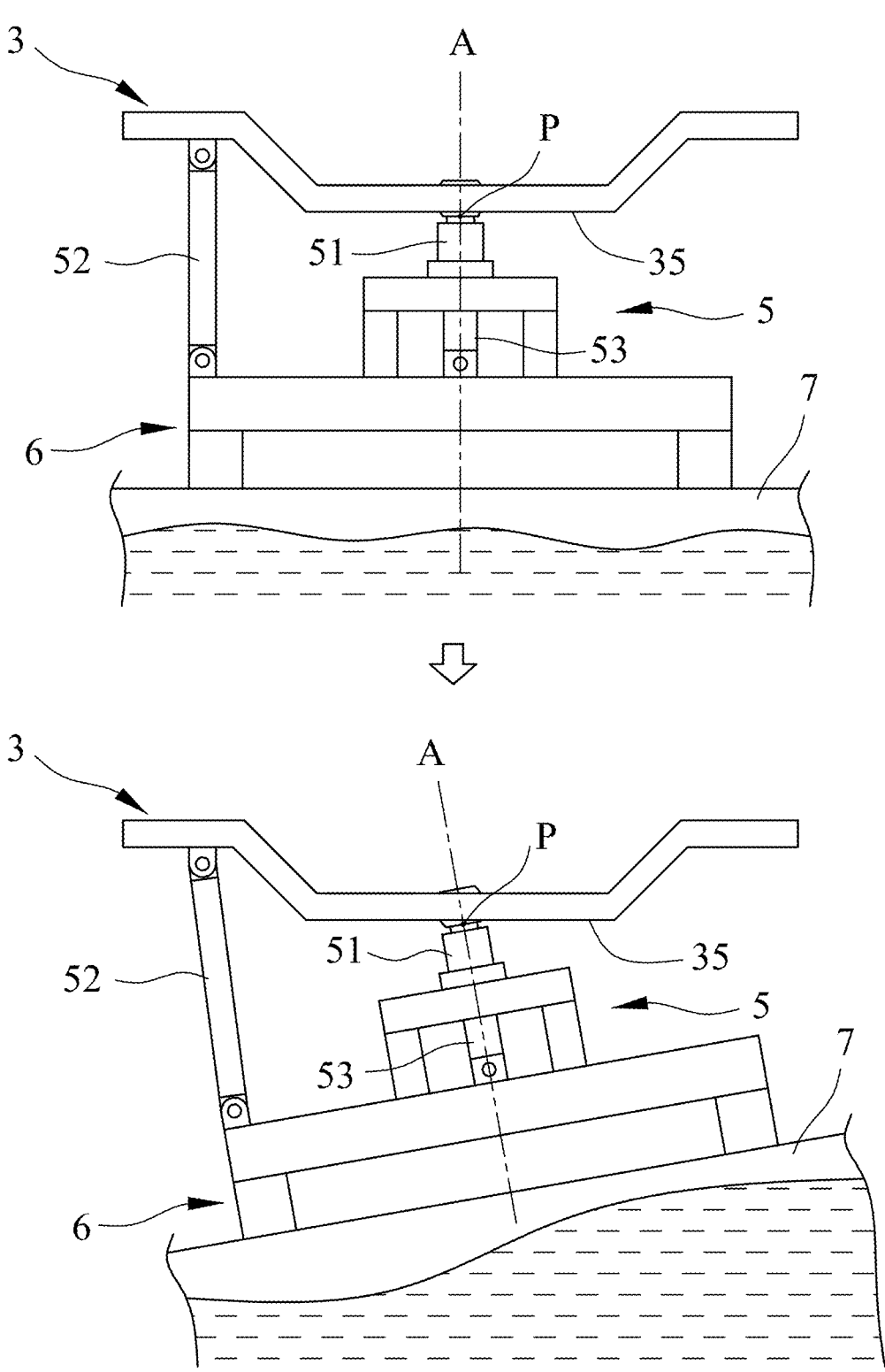
FIG. 6 is a schematic view illustrating the balance mechanism maintaining the parking platform to be parallel to a substantially horizontal plane.

Referring to FIGS. 5 and 6, the balance mechanism 5 is mounted under the parking platform 3 along the longitudinal axis (A), and is configured to maintain the parking platform 3 to be parallel to a substantially horizontal plane. In this embodiment, the bottom wall 35 of the parking platform 3 has a central point (P) located at a center thereof. The longitudinal axis (A) extends through the central point (P). The balance mechanism 5 includes a central support rod 51 connected pivotably to the bottom wall 35 at the central point (P), a first support rod 52 connected securely to the top wall 31 and disposed on a first axis (B) that extends through the longitudinal axis (A) and that extends along the top wall 31, and a second support rod 53 connected securely to the top wall 31 and disposed on a second axis (C) that is perpendicular to the first axis (B), that extends through the longitudinal axis (A) and that extends along the top wall 31. The first support rod 52 has a retractable length such that the parking platform 3 is rotatable about the second axis (C) with the central point (P) serving as a rotation center. Similarly, the second support rod 53 also has a retractable length such that the parking platform 3 is rotatable about the first axis (B) with the central point (P) serving as the rotation center. As described above, the parking platform 3 may move with the marine vehicle 7 and may be rocked by the wind waves, which leads to inclination of the parking platform 3 relative to the substantially horizontal plane. The balance mechanism 5 is configured to detect an inclination angle of the parking platform 3 relative to the substantially horizontal plane, and to control one of the first support rod 52, the second support rod 53 or both to adjust their respective lengths to thereby rotate the parking platform 3 about one of the second axis (C), the first axis (B) or both to maintain the parking platform 3 parallel to the substantially horizontal plane. For example, as depicted in the lower part of FIG. 6, when the marine vehicle 7 is inclined relative to the substantially horizontal plane, the first support rod 52 is controlled to expand in length such that the parking platform 3 rotates about the second axis (C) and is maintained parallel to the substantially horizontal plane. In this way, inclination of the parking platform 3 relative to the substantially horizontal plane caused by the wind waves may be alleviated so the UAV 1 may land on the bottom wall 35 in a relatively stable manner. It should be noted that the balance mechanism 5 may include a microcontroller or a controller such as, but not limited to, a single core processor, a multi-core processor, a dual-core mobile processor, a microprocessor, a digital signal processor (DSP), a field-programmable gate array (FPGA), an application specific integrated circuit (ASIC), a radio-frequency integrated circuit (RFIC), etc.

Referring back to FIG. 1, the guiding wall 33 is formed with a through opening 330 extending therethrough in a direction parallel to the longitudinal axis (A), and the base seat 6 is mounted under the balance mechanism 5, defines an accommodation space 60, and includes a stranded wire mechanism 61 disposed in the accommodation space 60. The stranded wire mechanism 61 includes an electrical wire 611 extending through the through opening 330 and connected to an electrical contact 11 of the UAV 1 for charging the UAV 1 when the landing member 2 is accommodated in the parking space 34. In this way, when the UAV 1 is parked on the parking platform 3, the stranded wire mechanism 61 may provide a downward restraining force to increase stability of the UAV 1 parked on the bottom wall 35.

In summary, in the UAV takeoff and landing system of the embodiment according to the present disclosure, by virtue of the landing member 2 cooperating with the guiding wall 33 that converges downwardly, when the UAV 1 is lowered down to land on the parking platform 3, the landing member 2 may be guided by and slide downwardly along the guiding wall 33 to move into the parking space 34, and thus the landing member 2 lands on the bottom wall 35 and is confined between the bottom wall 35 and the guiding wall 33. Furthermore, the identification device 4 may identify the first barcode 36, the second barcode 37, and the third barcode 38 to obtain the first direction information, the second direction information and the third direction information, and to generate the landing information for guiding the UAV 1 to precisely land on the parking platform 3.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An unmanned aerial vehicle (UAV) takeoff and landing system adapted to be used with a UAV, said UAV takeoff and landing system comprising:

a landing member adapted to be disposed under the UAV; and a parking platform adapted for guiding the UAV to land thereon, and including a top wall that surrounds a longitudinal axis and that defines a through hole extending therethrough along the longitudinal axis, a guiding wall that extends downwardly along the longitudinal axis from a hole-defining periphery of said top wall defining said through hole, and that converges downwardly along the longitudinal axis, and a bottom wall that is connected to one end of said guiding wall opposite to said through hole, and that cooperates with said guiding wall to define a parking space for accommodating said landing member;

the takeoff and landing system further comprising a balance mechanism mounted under said parking platform along the longitudinal axis, and configured to maintain said parking platform to be parallel to a substantially horizontal plane, said balance mechanism comprising a ball and socket joint arranged along the longitudinal axis.

2. The UAV takeoff and landing system as claimed in claim 1,

said bottom wall of said parking platform has a central point located at a center thereof, the longitudinal axis extending through said central point;

said balance mechanism includes a central support rod connected to said bottom wall at said central point, a first support rod connected securely to said top wall and disposed on a first axis that extends through the longitudinal axis and that extends along said top wall, and a second support rod connected securely to said top wall and disposed on a second axis that is perpendicular to the first axis, that extends through the longitudinal axis, and that extends along said top wall;

said first support rod has a retractable length such that said parking platform is rotatable about the second axis with said central point serving as a rotation center; and said second support rod has a retractable length such that said parking platform is rotatable about the first axis with said central point serving as the rotation center.

3. The UAV takeoff and landing system as claimed in claim 1, the UAV including an electrical contact, wherein:

said UAV takeoff and landing system further comprises a mount base mounted under said balance mechanism along the longitudinal axis and defining an accommodation space;

said guiding wall is formed with a through opening extending therethrough;

said mount base includes a stranded wire mechanism that is disposed in said accommodation space, and that includes an electrical wire extending through said through opening and adapted to be connected to the electrical contact for charging the UAV when said landing member is accommodated in said parking space.

4. The UAV takeoff and landing system as claimed in claim 1, wherein:

said UAV takeoff and landing system further comprises an identification device adapted to be mounted to the UAV;

said parking platform further includes a first barcode disposed on said top wall, a second barcode disposed on said guiding wall, and a third barcode disposed on said bottom wall; and said identification device is configured to identify said first barcode, said second barcode, and said third barcode and generate landing information adapted for guiding the UAV to land on said parking platform according to each of said first barcode, said second barcode and said third barcode.

5. The UAV takeoff and landing system as claimed in claim 4, wherein an area covered by said first barcode is larger than an area covered by said second barcode and an area covered by said third barcode.

6. The UAV takeoff and landing system as claimed in claim 1, wherein:

said landing member includes two branch portions spaced apart from each other in a transverse direction transverse to the longitudinal axis;

each of said two branch portions has an outermost point that is farthest from said outermost point of another one of said two branch portions; and a distance between said outermost points of said two branch portions in the transverse direction is smaller than a maximum cross-sectional size of said through hole along the longitudinal axis.

7. The UAV takeoff and landing system as claimed in claim 6, wherein:

each of said branch portions is semicircular;

said branch portions cooperate with each other such that said landing member is circular; and said guiding wall is a frusto-conical wall.

8. The UAV takeoff and landing system as claimed in claim 7, wherein an acute included angle defined between said guiding wall and said bottom wall is 45 degrees.

9. An unmanned aerial vehicle (UAV) takeoff and landing system comprising:

a UAV;

a landing member disposed under said UAV; and a parking platform for guiding said UAV to land thereon, and including a top wall that surrounds a longitudinal axis and that defines a through hole extending therethrough along the longitudinal axis, a guiding wall that extends downwardly along the longitudinal axis from a hole-defining periphery of said top wall defining said through hole, and that converges downwardly along the longitudinal axis, and a bottom wall that is connected to one end of said guiding wall opposite to said through hole, and that cooperates with said guiding wall to define a parking space for accommodating said landing member;

the takeoff and landing system further comprising a balance mechanism mounted under said parking platform along the longitudinal axis, and configured to maintain said parking platform to be parallel to a substantially horizontal plane, said balance mechanism comprising a ball and socket joint arranged along the longitudinal axis.

10. The UAV takeoff and landing system as claimed in claim 9, wherein:

said bottom wall of said parking platform has a central point located at a center of said bottom wall, the longitudinal axis extending through said central point;

said balance mechanism includes a central support rod connected to said bottom wall at said central point, a first support rod connected to said top wall and disposed on a first axis that extends through the longitudinal axis and that extends along said top wall, and a second support rod connected to said top wall and disposed on a second axis that is perpendicular to the first axis, that extends through the longitudinal axis, and that extends along said top wall;

said first support rod has a retractable length such that said parking platform is rotatable about the second axis with said central point serving as a rotation center; and said second support rod has a retractable length such that said parking platform is rotatable about the first axis with said central point serving as the rotation center.

11. The UAV takeoff and landing system as claimed in claim 9, wherein:

said UAV includes an electrical contact;

said UAV takeoff and landing system further comprises a mount base mounted under said balance mechanism and defining an accommodation space;

said guiding wall is formed with a through opening extending therethrough; and said mount base includes a stranded wire mechanism that is disposed in said accommodation space, and that includes an electrical wire extending through said through opening and connected to said electrical contact for charging said UAV when said landing member is accommodated in said parking space.

12. The UAV takeoff and landing system as claimed in claim 9, wherein:

said UAV takeoff and landing system further comprises an identification device mounted to said UAV;

said parking platform further includes a first barcode disposed on said top wall, a second barcode disposed on said guiding wall, and a third barcode disposed on said bottom wall; and said identification device is configured to identify said first barcode, said second barcode, and said third barcode to generate landing information for guiding said UAV to land on said parking platform according to each of said first barcode, said second barcode and said third barcode.

13. The UAV takeoff and landing system as claimed in claim 12, wherein an area covered by said first barcode is larger than an area covered by said second barcode and an area covered by said third barcode.

14. The UAV takeoff and landing system as claimed in claim 9, wherein:

said landing member includes two branch portions spaced apart from each other in a transverse direction transverse to the longitudinal axis;

each of said two branch portions has an outermost point that is farthest from said outermost point of another one of said two branch portions; and a distance between said outermost points of said two branch portions in the transverse direction is smaller than a maximum cross-sectional size of said through hole along the longitudinal axis.

15. The UAV takeoff and landing system as claimed in claim 14, wherein:

each of said branch portions is semicircular;

said branch portions cooperate with each other such that said landing member is circular; and said guiding wall is a frusto-conical wall.

16. The UAV takeoff and landing system as claimed in claim 14, wherein an acute included angle defined between said guiding wall and said bottom wall is 45 degrees.

* * * * *